Feb. 18, 1936.   A. SCHWARZ   2,031,387
NOZZLE
Filed Nov. 30, 1934
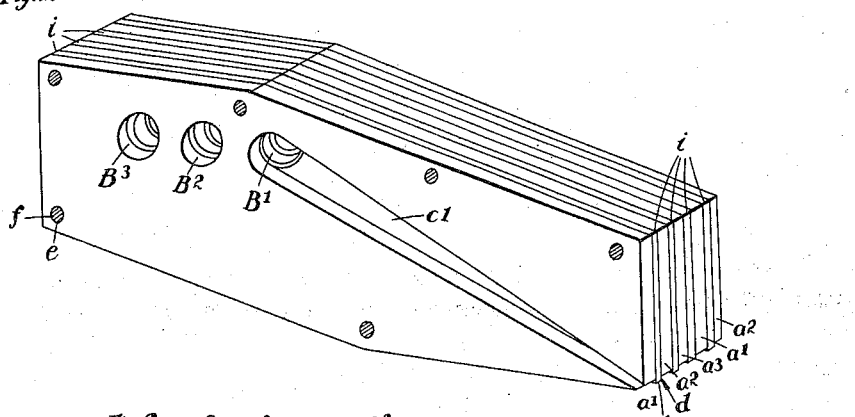
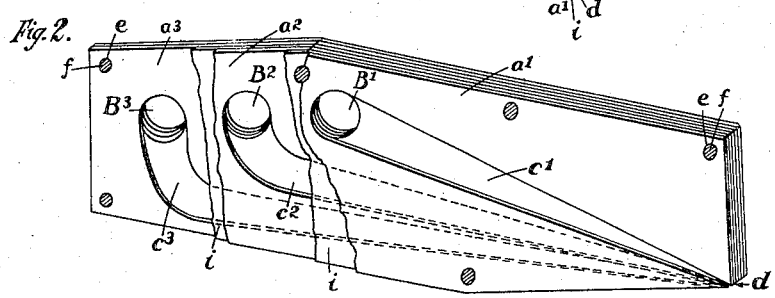
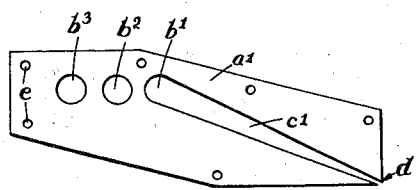
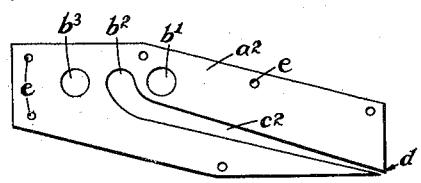
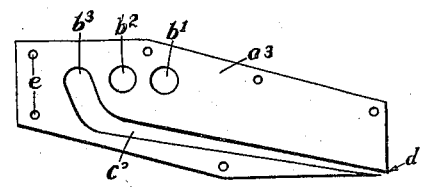
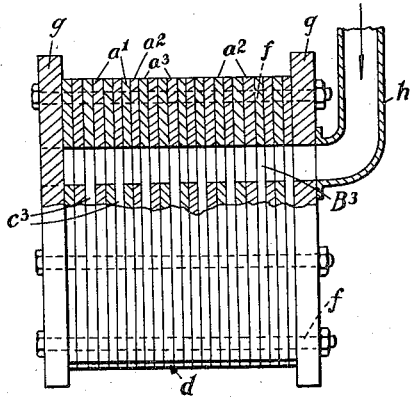
Inventor
A. Schwarz
by
W. E. Evans.
Attorney.

Patented Feb. 18, 1936

2,031,387

UNITED STATES PATENT OFFICE 2,031,387

NOZZLE

Arthur Schwarz, Berlin, Germany

Application November 30, 1934, Serial No. 755,457
In Germany August 22, 1934

6 Claims. (Cl. 18—8)

The invention relates to a system of nozzles by means of which it is possible to produce extremely fine threads of raw artificial silk or the like for use in the production of line screens for colour photography. Such line screens generally consist of a large number of extremely fine threads such as artificial silk threads of the basic colours—red, green and blue, these threads being disposed close beside one another on a transparent base. Great difficulties are encountered in producing screens of the kind above referred to because of the fineness of the threads to be laid on the base and because these threads must lie on the base in contact one with another. When using the nozzles hitherto employed for producing screen threads great difficulty is involved in placing the threads as they come from the nozzles to lie close together for the reason that the nozzles for producing threads which are to lie adjacent cannot be disposed as closely together as would be necessary for causing the threads to come to lie in contact on the base. It has therefore been proposed to divide the nozzles into several series of nozzles and to stagger them in a direction at right angles to the direction in which the threads issue from the nozzles. The use of nozzles thus arranged, that is to say the work of laying the threads uniformly distributed over the base, involves considerable difficulty.

These disadvantages are avoided in the use of nozzles constructed in accordance with the present invention.

According to the invention the system of nozzles is formed of a number of thin plates with their lateral faces in juxtaposition; these plates may be made of metal or any other thin plate-like material and may be joined firmly together to form a single block or the like. The plates contain a number of perforations passing completely through the block, but linking up separated perforations or the like, the number of holes corresponding to the number of different (for example differently coloured) substances which are to be converted into threads. Each plate also has a slot which extends from one of the perforations to the edge of the plate, the arrangement being such that the slots of adjacent plates extend from different perforations, while not overlapping each other up to the outlet at the edge of the plate. The several substances to be converted into threads are fed by means of suitable feeding tubes to the perforations extending through the block, regulable pressure being advantageously employed. The substance issuing forth from each of these perforaations enters the slots which extend from the corresponding perforations; it then leaves the block in the form of fine threads at the outlets of the slots which are at the edge of the plate and block.

If the slots of successive plates always extend in the same sequence to the perforations which pass through the whole block, the threads made from the different substances leave the inlets to the slots at the edge of the block in regular succession (red, green, blue, red, green blue and so on).

The nozzle-shaped channels and perforations formed by the slots in adjacent plates lie in contact and the threads which issue from the block immediately come to lie on the base in contact one with another.

In order to prevent the substances, which have been forced through the slots in the block, from coming into contact with each other at the outlet to the slot immediately before they leave the block, thin unslotted plates serving as distance pieces may be provided between the plates having the nozzle-shaped slots. These distance plates are provided merely with the openings which are necessary for feeding the substances and which are supplemented by the corresponding openings in the slotted plates for the feeding perforations. The interposed plates need to be only very thin; whereas the distance plates are provided of a thickness of for example 0.5 mm., the thickness of the interposed distance plates is only 0.2 mm. or even less. The purpose served is merely to keep apart the substances which pass through slots in adjacent plates. As the pressure to which the substances are exposed in the adjacent plates is uniform, the distance plates are not exposed to stresses and may therefore be extremely thin.

The plates with all their perforations, slots and the like are stamped out in one operation from a thin sheet of metal or the like.

It will have been seen from the foregoing that the system of nozzles according to the invention is not only structurally very simple and therefore easy to produce, but it makes it possible for the threads produced to pass close together side by side out of the nozzles. The disadvantages of the nozzles hitherto employed are thus in simple manner avoided.

One example of construction of nozzle according to the invention is diagrammatically illustrated in the accompanying drawing.

Figure 1 shows in side elevation the nozzle block formed of a number of adjacently disposed plates.

Figure 2 is a similar view to that of Figure 1, except that successive plates are shown partly broken away.

Figures 3, 4 and 5 illustrate three nozzle plates, and

Figure 6 shows a system of nozzles in end elevation, partly in section.

The nozzles are built up of the plates $a^1$, $a^2$, $a^3$ shown in Figures 3, 4 and 5. These plates lie in the finished block with their side faces touching as shown, for example, in Figure 6.

In the example illustrated each nozzle plate has three holes or perforations $b^1$, $b^2$, $b^3$; the holes or perforations in each plate are so disposed that when the plates are laid flat one against the other to form a block they each constitute a hole $B^1$, $B^2$, $B^3$ extending through the whole block (Figure 1).

Furthermore, each plate is provided with a slot $c^1$, $c^2$, $c^3$ which extends from the corresponding hole $B^1$, $B^2$, or $B^3$ to the edge of the plate $d$. The plates $a^1$, $a^2$, $a^3$, differ from one another only in that in one plate the slot $c^1$ commences at the hole or perforation $b^1$, in the next plate the slot $c^2$ commences at the hole or perforation $b^2$ and in the third plate a slot $c^3$ commences at the hole or perforation $b^3$. The slots are so provided in the plates $a^1$, $a^2$, $a^3$ that as shown in Figure 2 they do not overlap along their whole length apart from the actual outlet positions $d$.

Finally, the plates are provided with holes $e$ through which, as shown in Figure 6, bolts $f$ can be passed when the plates are assembled, the bolts serving in co-operation with two lateral plates $g$ to press the slotted plates $a^1$, $a^2$, $a^3$ tightly together.

The plates $a^1$, $a^2$, $a^3$ with the slots $c^1$, $c^2$, $c^3$ are placed side by side in regular sequence ($a^1$, $a^2$, $a^3$—$a^1$, $a^2$, $a^3$ .... and so on), and then are combined by means of the bolts $f$ and the side plates $g$ to form a block. The perforations $B^1$ $B^2$ $B^3$ are then, as shown in Figure 6, connected up to feed-tubes $h$ through which the substances to be converted into threads are supplied to the series of nozzles. The substance fed to the perforations $B^1$ enters the slots $c^1$ of all the plates $a^1$ and then passes out through the outlet of these slots in the form of threads, to the edge $d$ of the block.

As the slots $c^1$ apart from their outlets do not overlap by reason of the direction and disposition of the slots $c^2$, $c^3$ in the adjacent plates it is not possible for the different substances that pass through the various slots to mix prematurely. This effect is obtained for the simple reason that each of the slots $c^1$, $c^2$, $c^3$ is covered laterally by the whole surface of the adjacent plates. As at the same time different substances which are supplied to the corresponding slots $c^1$, $c^2$, $c^3$ are fed to the holes or perforations $B^1$ $B^2$ $B^3$, differently coloured threads, in number corresponding to the number of plates employed, pass out simultaneously at the outlets $d$ of the block, the threads coming to lie side by side and in contact so that they can without difficulty be arranged in this sequence on a support which extends the whole length of the series of nozzles beneath them. If necessary, the block may be staggered slightly in the direction of movement of the support if it is desired to place the threads packed still more closely together. The cross-sectional shape of the threads produced depends upon the shape of the outlets of the nozzles. In certain cases it is desirable to produce threads that have the shape of short sections rectangular in cross-section, which leave the nozzle outlets balanced on one of their edges, and are in that condition placed upon the support. In this case it is merely necessary to make the height of the slots $c^1$, $c^2$, $c^3$ greater than the width (thickness) of the plates $a^1$, $a^2$, $a^3$, in this way the outlets of the nozzles and therefore also the threads are of the desired rectangular cross-sectional shape. Figures 1 and 2 illustrate the construction in which between the slotted plates $a^1$, $a^2$, $a^3$, thin distance plates $i$ are provided, these having the three principal holes or perforations $b^1$, $b^2$, $b^3$ but are not slotted. In this case there cannot be near to the slot openings any premature contact between the substances that issue from the nozzle block in the form of threads. Since as already mentioned, the sealing plates are not exposed to any stresses, they may be made very thin.

If in one particular case, it should become necessary to avoid direct contact between the threads as they leave the nozzle openings, the plates $i$ may be of such construction that they extend a short distance near to the nozzle openings beyond the outer edge of the nozzle block. In this manner the separation of the threads produced in the nozzle block may be maintained for a further period after the threads have left the nozzle openings, so that all intermixing of the various masses of adjacently disposed threads is effectively avoided. If necessary, suitable cooling devices may be employed for treating the threads within the reach of the cover plates $i$ which extend beyond the nozzle block, so that the threads harden quickly. The plates $a^1$, $a^2$, $a^3$ can be stamped out from metal sheets or from a suitable thin flat piece of constructional or like material such as celluloid or the like, so that without any great expense, it is possible to produce a combined nozzle device which fully conforms to the requirements, particularly in connection with the construction of line screens, for colour photography. The use of the nozzle device according to the invention, as will be understood, is not confined to this purpose, indeed it may be employed wherever extremely fine threads are to be made from a liquid substance. If the threads are to be treated separately the device illustrated in Figures 1 and 2 with interposed sealing plates $i$ may with advantage be employed.

I claim:

1. A nozzle device for producing extremely fine threads from the raw substance of artificial silk or the like, particularly for use in producing line-screens for colour photography, characterized in that a number of thin plates, of for example metal laid side by side with their flat surfaces in contact, are securely joined together to form a block or the like, the plates according to the number of different substances to be formed into threads, contain a number of holes combined in the block to form holes or channels passing right through the block and separated one from the other while each plate has a slot which extends from one of the holes as far as the edge of the plates, the slots of adjacent plates extending from different holes or channels and not overlapping as far as their outlets which lie at the edges of the plates.

2. A nozzle device according to claim 1, characterized in that the slots in successive plates always extend in series in the same sequence to the holes or perforations which extend completely through the block of plates.

3. A nozzle device according to claim 1, characterized in that between the plates provided with the nozzle slots, unslotted thinner distance plates are provided which have in them only holes or perforations for supplying the basic substances.

4. A nozzle device according to claim 1, characterized in that between the plates provided with the nozzle slots, unslotted thinner distance plates are provided which have in them only holes or perforations for supplying the basic substances and that the distance plates between the slotted plates which are near the nozzle openings at the edge of the metal plate extend beyond the periphery of the nozzle block, and thus maintain the threads out of contact as they come from the nozzle block.

5. A nozzle device according to claim 1, characterized in that distance plates are provided which extend beyond the periphery of the nozzle block, and that cooling devices are provided which cause the rapid hardening of the threads as they leave the nozzle outlets.

6. A nozzle device according to claim 1, characterized in that the height of the slots in the plates is greater than the thickness of the plates so that threads are extruded which are rectangular in cross-section and standing on edge.

ARTHUR SCHWARZ.